United States Patent Office 3,754,057
Patented Aug. 21, 1973

3,754,057
POLYMERS OF 5-(3-PERFLUOROALKYL-1,2,4-OXADIAZOLYL)OLEFINS
Pier Luigi Pacini, Brussels, Belgium, and Eduard Karl Kleiner, New York, N.Y., assignors to Ciba-Geigy Corporation
No Drawing. Original application June 16, 1969, Ser. No. 833,706. Divided and this application Nov. 17, 1971, Ser. No. 199,790
Int. Cl. C08f $29/50$; C08j $37/18$
U.S. Cl. 260—901
10 Claims

ABSTRACT OF THE DISCLOSURE

Monomeric 5-(3 - perfluoroalkyl-1,2,4-oxadiazolyl)olefins form homopolymers and copolymers with other ethylenically unsaturated comonomers. The polymers obtained have valuable soil repellent and dyesite properties which are especially useful in textile finishes. Preferred compounds exemplified are 1,2-bis[5-(3-n-perfluoroheptyl-1,2,4-oxadiazolyl)]ethylene and 5-isopropenyl-3-n-perfluoroheptyl-1,2,4-oxadiazole.

---

This is a divisional of application Ser. No. 833,706, filed on June 16, 1969, now U.S. Pat. No. 3,645,985.

THE INVENTION

This invention relates to novel monomers and the polymers which can be prepared from them. The resulting polymers possess excellent soil repellent properties. These polymers provide oil and water repellent finishes useful in treating materials such as textiles, paper, leather, painted wooden and metallic surfaces and the like. In addition all of the polymers are useful as dyesites for acidic, direct and metallized dyestuffs.

The monomer compounds of the present invention are 5-(3-perfluoroalkyl-1,2,4-oxadiazolyl)ethylenes.

One type of monomer compounds are represented by the following formula:

$$C_mF_{2m+1}-C\underset{N}{\overset{N=\!=\!C-R^1}{\underset{\diagdown}{\diagup}}}O \qquad (I)$$

wherein $m$ is an integer of 1 to 18, preferably 3 to 7 and most preferably 7; and
$R^1$ is $$-CH=CH_2 \text{ or } -\underset{CH_3}{\overset{|}{C}}=CH_2$$

A second type of monomer compounds are represented by the following formula:

$$\left[C_mF_{2m+1}-C\underset{N}{\overset{N=\!=\!C-}{\underset{\diagdown}{\diagup}}}O\right]_2 R^2 \qquad (II)$$

wherein $m$ is an integer of 1 to 18, preferably 3 to 7 and most preferably 7; and
$R^2$ is an ethylenically unsaturated hydrocarbon radical derived from fumaric, maleic, citraconic, mesaconic or itaconic acid.

The corresponding polymers of the monomers of this invention are those having skeletal chains comprising repeating units of $$C_mF_{2m+1}-C\underset{N}{\overset{N=\!=\!C-R^1}{\underset{\diagdown}{\diagup}}}O \qquad (III)$$

or $$\left[C_mF_{2m+1}-C\underset{N}{\overset{N=\!=\!C-R^{2'}}{\underset{\diagdown}{\diagup}}}O\right]_2 \qquad (IV)$$

respectively, wherein $m$ is as defined above, and
$R^1$ is $$-CH_2-CH_2- \text{ or } -\underset{CH_3}{\overset{|}{C}H}-CH_2-$$

$R^{2'}$ is a hydrocarbon radical derived from fumaric, maleic, citraconic, mesaconic or itaconic acid.

The invention related further to new compounds of the formula $$\left(C_mF_{2m+1}-\overset{NH_2}{\underset{|}{C}}=N-O-\overset{O}{\underset{\|}{C}}-\right)_x R^2$$

wherein $m$ and $R^2$ are as above defined
which compounds are used as starting material for the monomers of the Formula II.

As indicated in the foregoing formulae, perfluoro groups of 1 to 18 carbon atoms may be employed and it is to be understood that mixtures of compounds of perfluoro groups of different numbers of carbon atoms within the foreoing range can be employed. Both straight and branched chain perfluoro groups are contemplated.

The monomer compounds of Formula I and Formula II may be prepared by procedures well-known to those skilled in the art, for example, as described in Brown and Wetzel Journ. of Org. Chem. 30, 3734 (1965). In both instances the fluorinated O-substituted amidoximes employed as a starting material may be prepared by known procedures such as described in the copending application Ser. No. 586,956 according to the reaction outlined in the following sequences:

For the monomers of Formula I $$C_mF_{2m+1}-C\underset{N-OH}{\overset{NH_2}{\underset{\diagdown}{\diagup}}} + \underset{Y}{\overset{O}{\underset{\diagdown}{\diagup}}}C-R^1 \longrightarrow$$

$$C_mF_{2m+1}-\overset{NH_2}{\underset{|}{C}}=N-O-\overset{O}{\underset{\|}{C}}-R^1 + HY$$

For the monomers of Formula II $$2C_mF_{2m+1}-C\underset{N-OH}{\overset{NH_2}{\underset{\diagdown}{\diagup}}} + \underset{Y}{\overset{O}{\underset{\diagdown}{\diagup}}}C-R^2-C\overset{O}{\underset{Y}{\diagdown}} \longrightarrow$$

$$\left(C_mF_{2m+1}-\overset{NH_2}{\underset{|}{C}}=N-O-\overset{O}{\underset{\|}{C}}-\right)_2 R^2 + 2H$$

$R^1$ and $R^2$ as well as $m$ are defined above and Y is halogen such as chlorine or bromine. The condensation is effected merely by bringing together the amidoxime and the acyl halide.

It is preferred to conduct the reaction in a solvent, suitably dry acetonitrile, and to stir the reaction mixture for from about 1 hour to about 12 hours at a temperature of from about 25° C. to about 85° C. to insure highest yields. The product is recovered by evaporating the solvent. The product, which remains as a residue, can be purified, if desired, by recrystallization from a hydrocarbon solvent, such as petroleum ether mixed with a ketonem such as acetone, or an ester, such as ethyl acetate.

The starting materials for the O-substituted amidoximes are readily available or can be prepared by techniques within the capabilities of those skilled in the art. The preparation of perfluoroacylamidoximes are described in Brown and Wetzel in J. Org. Chem. 30, 3734 (1965).

The acyl halides are items of commerce or can be obtained by procedures very well known to those skilled in the art.

The monomer compounds of the Formulas I and II may be prepared by reacting O-acyl perfluoroacylamidoximes with cycling agents or by thermal dehydration. Illustrative of the O-acyl perfluoroacylamidoximes useful in the practice of the invention are O-methacrylyl perfluorooctanamidoxime, O-methacrylyl acetamidoxime, O-fumaryl bis-(n-perfluorooctanamidoxime) and O-fumaryl bis-(n-perfluorobutyramidoxime).

Representative cycling agents effective in ring-closing the aforementioned O-acyl perfluoroacylamidoximes are phosphorous pentoxide, formamidine or s-triazine.

The thermal dehydration is effected by heating the amidoximes in a distilling flask with a direct flame under normal pressure or under vacuum.

The polymers contemplated by the present invention include homopolymers of the novel fluoromonomers, copolymers with other ethylenically unsaturated monomers, and physical blends of such homopolymers and copolymers together and/or with other polymers.

Since the novel homopolymers and copolymers find substantial use as textile finishes, it is often desirable to include in the monomer mixture from about 0.2 to about 5% by weight of a reactive acrylic, which permits cross-linking either by heat or cross-linking agents. Such reactive fluorocopolymers give textile finishes with superior resistance to washing, dry cleaning, scrubbing, abrasion, and crocking, both wet and dry, and also a better durability of the oil and water repellency properties.

It is also advantageous, especially in the preparation of fabric finishes, to use blends of emulsions or solutions of other polymers such as polyalkyl acrylates and polyalkyl methacrylates, illustrative of which is poly (n-octyl-methacrylate). Such blends serve both to substantially reduce the amount of required fluorinated polymer to achieve commercially acceptable repellency characteristics and to impart a softer finish to the fabric than if the more brittle fluorinated polymers were used alone.

Polymerization of the monomers may be carried out in bulk, solution, or emulsion. The preferred polymerization techniques are emulsion polymerization in an aqueous medium and solution polymerization. The polymerization temperature will vary depending upon the catalyst chosen.

In emulsion polymerization, the monomer or monomers to be polymerized are emulsified preferably together with a solvent such as acetone in a water solution of a surface active agent to a given monomer concentration of from about 5% to about 50%. Usually the temperature is raised to between 70–100° to effect polymerization in the presence of an added catalyst. A suitable catalyst may be any one of the commonly known water soluble agents for initiating the polymerization of an ethylenically unsaturated compound. The concentration of the catalyst for the polymerization is usually between 0.1% and 2% based upon the weight of the monomers.

Suitable surfactants or emulsifying agents include cationic, anionic or non-ionic types. Since the cationic types can be used in most textile treating baths, they are preferred. The hydrophobic portion of the surfactant may be hydrocarbon or fluorinated hydrocarbon.

Suitable surfactants that may be used include, for example, non-ionic surfactants in which the hydrophilic group is a poly(ethoxy) group and the hydrophobic portion is either a hydrocarbon or a fluorocarbon group such as the ethylene oxide condensates of alkyl phenols, alkanols, alkylamines, alkylthiols, alkylcarboxylic acids, fluoroalkyl carboxylic acids, fluoroalkyl amides and the like.

Suitable cationic surfactants include for example quaternary ammonium salts or amine salts containing at least one long chain alkyl, fluoroalkyl, or high alkyl substituted benzene or naphthalene group to provide the hydrophobic portion.

Polymerization is preferably carried out for a reaction period adjusted to obtain essentially quantitative conversion of the fluorinated monomer. The optimum reaction time will depend upon the catalyst used and the polymerization temperature and other conditions, but will generally be in the range of from 0.5 to 24 hours.

The polymerization is generally most conveniently and preferably carried out at atmospheric pressure wherever possible.

In solution polymerization, the monomer or monomers are dissolved in a suitable solvent such as fluorinated solvents, for example, fluorohalogenated hydrocarbons, hexafluoroxylene, trifluorotoluene or mixtures thereof with acetone and/or ethyl acetate, other fluorinated solvents and the like, and then polymerized in a reaction vessel using initiators such as azobisisobutyronitrile, benzoyl peroxide, or t-butyl perbenzoate, at concentrations of 0.1 to 2.0% at 70–140° C., under nitrogen.

As mentioned, besides homopolymers, valuable copolymers are obtained by polymerization of the foregoing novel perfluorinated monomers with other polymerizable monomers having ethylene unsaturation.

Monomers of the type I show a copolymerization behavior similar to acrylate and methacrylate monomers. These comonomers are described in detail in C. E. Schildknecht, Vinyl and Related Polymers, pp. 175–255 (John Wiley & Sons, Inc., New York 1952). Of these comonomers the most preferred are esters of acrylic and methacrylic acid with alkyl ester groups from 1 to 18 carbons such as methyl-, ethyl-, i-propyl-, n-butyl-, n-hexyl-, n-octyl-, 2-ethylhexyl-, n-dodecyl-, n-octadecyl acrylate and methacrylate.

Monomers of type II show a copolymerization behavior similar to fumarates and maleates. Examples of suitable comonomers for monomers of type II are alkyl vinyl ethers, such as methyl vinyl ether, isopropyl vinyl ether, isobutyl vinyl ether, 2-methoxyethyl vinyl ether, n-propyl vinyl ether, t-butyl vinyl ether, isoamyl vinyl ether, n-hexyl vinyl ether, 2-ethylbutyl vinyl ether, diisopropyl-methyl vinyl ether, i-methylheptyl vinyl ether, n-decyl vinyl ether, n-tetradecyl vinyl ether, and n-octadecyl vinyl ether.

Vinyl comonomers with short side chains are preferred.

Of these vinyl ethers, the most preferred ones are: methyl vinyl ether, ethyl vinyl ether, n-propylvinyl ether, isopropyl vinyl ether, 2-methoxyethyl vinyl ether and 2-chloroethyl vinyl ether.

Propylene, butylene and isobutylene are preferred α-olefins useful as comonomers with the novel fluoro monomers of the present invention. Especially preferred is isobutylene. Straight and branched chain α-olefins are useful with up to 18 carbon atoms in the side chain.

Useful copolymers of the novel perfluorinated compounds of the invention are formed with vinyl esters, e.g. vinyl acetate, vinyl esters of substituted acids, such as for example, vinyl methoxyacetate, vinyl trimethylacetate, vinyl isobutyrate, isopropenyl butyrate, vinyl lactate, vinyl caprylate, vinyl pelargonate, vinyl myristate, vinyl oleate and vinyl linoleate; vinyl esters of aromatic acids, such as vinyl benzoate, and vinyl alkoxybenzoates.

Preferred of the foregoing vinyl esters are vinyl acetate, vinyl propionate, vinyl benzoate, and isopropenyl acetate.

Also useful as comonomers are styrene and related monomers which copolymerize readily with the novel esters of this invention such as α-methylstyrene, p-methylstyrene, 3,4-dimethylstyrene, 2,4,6-trimethylstyrene, m-ethylstyrene, 2,5-diethylstyrene.

Additional useful comonomers are ethylene, and chloro-, fluoro- and cyano-derivatives of ethylene such as vinyl chloride, vinylidene chloride, vinyl fluoride, vinylidene fluoride, acrylonitrile, methacrylonitrile, tetrafluoroethylene, trifluorochloroethylene, hexafluoropropylene; acrylate and methacrylate monomers, particularly those with 1 to 18 carbon atoms in the esters groups such as n-propyl methacrylate, methyl methacrylate, t-butyl methacrylate, n-butyl methacrylate, methyl acrylate, ethyl acrylate, propyl acrylate, butyl acrylate, octyl acrylate, tetradecyl acrylate, s-butyl acrylate, 2-ethylhexyl acrylate, 2-methoxyethyl acrylate, and phenyl acrylate; dienes particularly 1,3-butadiene, isoprene, and chloroprene, 2-fluoro-butadiene, 1,1,3-trifluorobutadiene, 1,1,2,3-tetrafluorobutadiene, 1,1,2-trifluoro-3,4-dichloro-butadiene, and tri- and pentafluoro butadiene and isoprene; nitrogen-vinyl monomers such as vinyl pyridine, N-vinylimides, amides, and secondary cyclic amines, like vinyl succinimide, vinyl pyrolidone, N-vinyl carbazole and the like.

Also useful as comonomers with the novel monomers of the present invention are vinyl monomers which contain perfluorinated side chains. Examples of such perfluorinated monomers are vinyl ethers of the type disclosed in U.S. 2,732,370 and U.S. 2,828,025; vinyl esters containing fluorinated alkyl groups disclosed in U.S. 2,592,069 and U.S. 2,436,144. Other useful monomers are acrylates and methacrylates and derivatives thereof such as those disclosed in U.S. 2,628,958; U.S. 3,256,230; U.S. 2,839,513; U.S. 3,282,905; U.S. 3,252,932 and U.S. 3,304,278.

As mentioned, it may also be desirable to include a minor amount of other reactive comonomers in order to improve the wash and dry-clean properties of the novel textile finishes obtained according to the practice of this invention. Such monomers act as cross-linking agents during the curing operation. Such reactive comonomers are generally employed in amounts of 0.1 to 2%. By way of illustration, reactive monomers which may be included are: acrylic acid, methacrylic acid, acrylamide, methacrylamide, N-methylolacrylamide, 2-hydroxyethyl methacrylate or acrylate, hydroxypropyl acrylate or methacrylate, and t-butylaminoethyl methacrylate or glycidyl methylate. Of the foregoing, N-methylolacrylamide and 2-hydroxyethyl methacrylate are preferred.

Coatings of the homopolymers and copolymers according to the present invention can be prepared and applied from solvent solutions or from aqueous emulsions. Suitable solvents are fluoroalkanes, fluorochloroalkanes, fluoroalkyl-substituted aromatics, alkyl esters of perfluoroalkanoic acids, chlorinated alkanes or aromatics, hydrocarbon aromatics, ketones, esters, and ethers. Especially useful as solvents are the fluorinated liquids, and especially $\alpha,\alpha,\alpha$-trifluorotoluene, otherwise known as benzotrifluoride, hexafluoroxylene and mixtures of these with ethyl acetate or acetone and the like. Concentrations of the fluorinated polymers of the present invention in solvents to provide coatings with effective oil and water repellency properties will generally be of the order of 0.01 to 10% and preferably from 0.1 to 2.0% by weight.

As indicated, blends of the emulsions of the polymers of this invention with blended emulsions of other polymers and copolymers are particularly useful in textile finishes.

Non-fluorinated polymers useful in such blends, include for example, but without limitation, polymers and copolymers of alkyl acrylates and alkyl methacrylates, such as methyl methacrylate, ethyl methacrylate, hexyl methacrylate, and n-octyl methacrylate. A particularly suitable polymer is poly (n-octyl methacrylate).

Also useful are polymers and copolymers of acrylic acid, methacrylic acid, styrene, alkyl styrene, butadiene, 2-methyl-1,3-butadiene, 2-chloro-1,3-butadiene; polymers and copolymers of vinyl esters such as vinyl acetate, vinyl butyrate, vinyl laurate, vinyl stearate, vinyl 2-ethylhexanoate; polymers and copolymers of vinyl halides and vinylidene halides, such as vinyl chloride, vinylidene chloride, vinyl fluoride, vinylidene fluoride; polymers and copolymers of allyl esters such as allyl propionate, or allyl caprylate; polymers and copolymers of vinyl ketones, such as vinyl methyl ketone, vinyl ethyl ketone, and the like; polymers and copolymers of vinyl ethers such as methyl vinyl ether, cetyl vinyl ether, and the like; polymers and copolymers of acrylamide, methacrylamide, N-methylol acrylamide, N-methylol methacrylamide, N-isopropyl acrylamide, and acrylonitrile and methacrylonitrile.

For example, from about 20 to 97% by weight of a homopolymer of poly(n-octyl methacrylate) blended with the polymers of this invention provides very useful coating compositions which retain surprisingly high repellency ratings even though the relative amount of perfluorinated polymer of this invention is relatively low. Of course, it is understood that besides application to textiles, the coatings of the perfluorinated polymers of the present invention are useful in providing oil and water repellent coatings for leather, paper, wood, masonry, metals, plastics, glass, painted surfaces, and the like. Coatings may be readily applied by various coating techniques familiar to the art, such as dipping, spraying, brushing, padding, roll coating, and the like.

For evaluation purposes, the textile material in the following examples was dipped in the bath comprising the polymer to be evaluated and the amount of the retailed solution adjusted so as to leave approximately 2% of polymer by weight of the fabric on the fabric. The fabric is dried at room temperature and then cured in an oven at a temperature of about 175° C. for about 2 minutes.

The type of textile material which is coated is not critical. For evaluation purposes, repellency ratings for cotton or wool are determined as a standard screening procedure; however, such fibers such as fiberglass, silk, regenerated cellulose, cellulose esters and ethers, polyamides, polyesters, polyacrylonitrile, polyacrylates and other fibers alone or blended or in combination may be coated with the polymers of the present invention.

The present invention also relates to compositions comprising difficult dyeable organic materials and, as an assistant and dyesite, a homopolymer of a compound of Formula I or II or copolymers thereof. While the inherent physical properties of synthetic organic polymeric substances, such as poly-$\alpha$-olefins of the polyethylene and polypropylene type, make possible a wide range of applications, they also present a number of problems in processing and use, such as a marked resistance to dyeing. One embodiment of the present invention is based on the discovery that the instant polymers, render difficult dyeable organic material more amenable to dyeing. Particularly effective for this purpose are homo- and copolymers of 5-isopropenyl-3-n-perfluoroheptyl - 1,2,4 - oxadiazole and trans-1,2-bis-[5-(3-perfluoroheptyl - 1,2,4 - oxadiazolyl)] ethylene.

The compounds of this invention may be incorporated in the difficult dyeable organic substance during the usual processing operations. Thus for example, they can be introduced into polypropylene by hot milling, the polymers then being extruded, pressed, blow molded or the like, into films, fibers, filaments, hollow shapes and the like. The new compositions can be dyed, either directly after compounding or after further processing, such as the formation of yarns or fabrics.

The conditions of dyeing will of course vary with the particular dye employed. Generally the nature of the dye is not restricted and any of the many known acidic, direct and metallized dyes may be employed. Generally from about 0.05 to 10% and preferably about 0.1 to 6% by weight of the instant polymers in the difficult dyeable organic material, is used, but the amount is not critical.

While polypropylene has been herein mentioned specifically, it is apparent that the instant compounds are useful in numerous other substances whose regular and inert chemical structures tend to resist dyes. Materials for which the compounds of the present invention are useful thus include synthetic organic polymeric substances, both homopolymeric and copolymeric, such as vinyl resins, poly-$\alpha$-olefins, polyurethanes, polyamides, polyesters, polycarbonates, polyacetals, polystyrene, polyacrylics, and the like.

In the examples below, the repellency ratings were determined as follows:

The AATCC water spray test rating was determined according to Standard Test method 22–1966 of the American Association of Textile Chemists and Colorists, XXXVII, 1961, p. 1952 (also designated ASTM–D 583–58).

Oil repellency is measured by the 3-M-Oil test procedure of Grajek and Peterson, Textile Research Journal, April 1962, p. 323.

The following examples describing certain representative embodiments of this invention will serve to further illustrate the nature of this invention. Unless otherwise specified, the relationship of parts by weight to parts by volume is that of grams to cubic centimeters, and temperatures are degrees centigrade.

EXAMPLE I 5-isopropenyl-3-n-perfluoroheptyl-1,2,4-oxadiazole (A) O - methacrylyl perfluorooctanamidoxime.—Perfluorooctanamidoxime (prepared according to H. C. Brown and C. R. Wetzel, J. Org. Chem. 30, 3734 (1965); 27 g., 0.063 mole) is finely pulverized and suspended in dry acetonitrile (140 ml.). A solution of methacrylyl chloride (6.6 g., 0.063 mole) in 14 ml. of dry acetonitrile is added to the suspension dropwise at room temperature with vigorous stirring. The mixture is stirred for two hours at room temperature and then refluxed for two additional hours. Removal of the solvent under reduced pressure leaves a crystalline product, which after crystallization from acetonehexane affords 27 g. (86%) of O-methacrylyl perfluorooctanamidoxime, M.P. 132.5–137°.

The NMR spectrum (acetone-$d_6$) shows a doublet at $2.00\delta(CH_3)$, two multiplets at 5.71 and 6.24 for the vinylic protons and a broad signal at 6.97 for the —$NH_2$—. The infrared spectrum has absorptions at 2.8–3.0$\mu$ ($NH_2$), 5.75 (C=O), 6.0 (C=N) and 6.2 (C=C).

*Analysis.*—Calcd. for $C_{12}F_{19}H_7N_2O_2$ (percent): C, 29.04; H, 1.42. Found (percent): C, 29.24; H, 1.36.

If in the above example instead of perfluorooctanamidoxime perfluorobutylamidoxime, perfluorododecanamidoxime or perfluorononadecanamidoxime and instead of methacrylyl chloride acrylyl chloride are employed, there is obtained O-acrylyl perfluorobutyramidoxime, O-acrylyl perfluorododecanamidoxime or O-acrylyl perfluorononadecanamidoxime.

(B) 5 - isopropenyl - 3 - n - perfluoroheptyl - 1,2,4-oxadiazole.—O - methacrylyl perfluorooctaneamidoxime (0.054 mole) is thoroughly mixed with an excess of phosphorous pentoxide (0.35 mole) and placed in a distilling flask connected to an ice cooled trap. The flask is then heated with a direct flame under an initial vacuum of 1 mm. Hg of pressure. The reaction is quick and once started, it proceeds without additional heating. The yield of crude product is 7.0 grams, B.P. 63° at 0.09 mm. of pressure.

The NMR spectrum shows a singlet at 1.8$\delta$ for the methyl protons and two multiplets at 5.3 and 5.9 for the vinyl protons.

If in the above example instead of O-methacrylyl perfluorooctanamidoxime, O-acrylyl perfluorobutyramidoxime, O-acrylyl perfluorododecanamidoxime or O-acrylyl perfluorononadecanamidoxime are employed, 5-vinyl-3-n-perfluoropropyl-1,2,4-oxadiazole, 5 - vinyl-3-n-perfluoroundecyl - 1,2,4 - oxadiazole or 5-vinyl-3-n-perfluorooctadecyl-1,2,4-oxadiazole respectively are obtained.

EXAMPLE 2

Trans-1,2-bis[5-(3-n-perfluoroheptyl-1,2,4-oxadiazolyl)]ethylene (A) O - fumaryl bis(n-perfluorooctanamidoxime).—Fumaryl chloride (3.2 g. 0.0209 mole) in 20 ml. of spectrograde acetonitrile is added dropwise to a stirred mixture of n-perfluorooctanamidoxime[1] (19 g., 0.044 mole) in 80 ml. of acetonitrile. After the addition is completed, the reaction mixture is boiled gently for ninety minutes while a stream of nitrogen is passed through the reaction flask to carry off the evolved hydrogen chloride. The product was filtered and dried to afford 19.5 grams of O-fumaryl bis(n-perfluorooctanamidoxime), M.P. 266° (dec.).

*Analysis.*—Calcd. for $C_{20}H_6F_{30}N_4O_4$ (percent): C, 25.65; H, 0.64; F, 60.87; N, 5.98. Found (percent): C, 25.79; H, 0.60; F, 61.40; N, 5.85.

If in the above example instead of fumaryl chloride, citraconyl chloride, mesaconyl chloride or itaconyl chloride are employed, O-fumaryl bis(n-perfluorooctanamidoxime), O-citraconyl, O-mesaconyl or itaconyl bis(n-perfluorooctanamidoxime) respectively are obtained.

(B) Trans - 1,2 - bis[5-(3 - n - perfluoroheptyl-1,2,4-oxadiazolyl)]ethylene.—O-fumaryl -bis(n-perfluorooctanamidoxime), (3.0 grams) is placed in a round bottom flask and heated with direct flame until all melts. The cooled reaction mixture is crystallized from chloroform to afford 2.3 grams of yellow product M.P. 83–84°. The ultraviloet spectrum (methanol) has absorption at $\lambda_{278}$ and $\lambda_{268.5}$ m$\mu$ with an extraction coefficient of 12600 and 13800 respectively.

*Analysis.*—Calcd. for $C_{20}H_2F_{30}N_4O_3$ (percent): C, 26.88; H, 0.22; F, 63.31; N, 6.22. Found (percent): C, 26.99; H, 0.17; F, 63.27; N, 7.72.

If in the above example instead of O-fumaryl bis(n-perfluorooctanamidoxime), O-citraconyl, O-mesaconyl or O-itaconyl bis(n-perfluorooctanamidoxime) are employed, trans-1,2-bis[5-(3-n-perfluoroheptyl-1,2,4-oxadiazolyl)] ethylene,
cis- and trans-1,2-bis[5-(3-n-perfluoroheptyl-1,2,4-oxadiazolyl)]prepene, and
2,3-bis[5-(3-n-perfluoroheptyl-1,2,4-oxadiazolyl)] propene
respectively are obtained.

EXAMPLE 3

Trans-1,2-bis[5-(3-n-perfluoropropyl-1,2,4-oxadiazolyl)]ethylene (A) O-fumaryl bis(n-perfluorobutyramidoxime.—This compound is prepared from fumaryl chloride and n-perfluorobutyramidoxime following an analogous procedure as Part A of Example 2. The yield was 87% and the product melts at 277° with decompositions.

*Analysis.*—Calcd. for $C_{12}H_6F_{14}N_4O_4$ (percent): C, 26.87; H, 1.12; F, 49.60; N, 10.44. Found (percent): C, 27.00; H, 1.12; F, 49.55; N, 10.53.

If in the above example instead of n-perfluorobutyramidoxime, n-perfluorododecanamidoxime or n-perfluorononadecanamidoxime are employed, O-fumaryl bis(n-perfluorobutyramidoxime), O-fumaryl bis(n-perfluorododecanamidoxime) or O-fumaryl bis(n-perfluorononadecanamidoxime) respectively are obtained.

(B) Trans-1,2-bis[5-(3-n-perfluoropropyl-1,2,4-oxadiazolyl)] ethylene.—The dehydration of O-fumaryl bis(n-perfluorobutyramidoxime) of A was carried out as described in Part B of Example 2. The product is crystallized from petroleum ether, M.P. 62–65°.

If in the above example instead of O-fumaryl bis(n-perfluorobutyramidoxime), O-fumaryl bis(n-perfluorododecanamidoxime) or O-fumaryl bis(n-perfluorononadecanamidoxime) are employed, trans-1,2,-bis[(5-(3-n-perfluoropropyl-1,2,4-oxadiazolyl)] ethylene,

---

[1] H. C. Brown and C. R. Wetzel, J. Org. Chem. 30, 3734 (1965).

trans-1,2-bis[5-(3-n-perfluoroundecyl-1,2,4-oxadiazolyl)]
ethylene or
trans-1,2-bis[5-(3-n-perfluorooctadecyl-1,2,4-oxadiazolyl)] ethylene respectively are obtained.

EXAMPLE 4

100 parts of a mixture of 5-isopropenyl-3-n-perfluoroheptyl-1,2,4-oxadiazole prepared according to Example 1, and n-octyl methacrylate as indicated in the following Table I and 1 part of azobisisobutyronitrile are sealed in an ampul under nitrogen and polymerized at 80° for 16 hours. Then the polymer is dissolved in 500 parts of benzotrifluoride and precipitated into 20 times the amount of methanol. The homo- and copolymers are obtained after high vacuum drying as fine, white powders. The copolymer composition, determined by fluorine analysis and the repellency ratings obtained when evaluated after applying 2% by weight of the novel polymers on fabrics from a benzotrifluoride solution, are given in the following table.

TABLE I

| Ex. | 5-isopropenyl-3-n-perfluoroheptyl-1,2,4-oxadiazole (percent by weight) | n-Octyl-methacrylate Percent by weight | Dynes cm. | Repellency (2% polymer on fabric) Fabric | 3-M-Oil | AATCC-water |
|---|---|---|---|---|---|---|
| 4a | 100 | None | 11.5 | Cotton | 90 | 90 |
|   |   |   |   | Wool | 80 | 80 |
| 4b | 88.5 | 11.5 |   | Cotton | 80 | 80 |
|   |   |   |   | Wool | 70 | 90 |
| 4c | 78.8 | 21.2 |   | Cotton | 70 | 80 |
|   |   |   |   | Wool | 70 | 90 |
| 4d | 54.0 | 46.0 |   | Cotton | 60 | 70 |
|   |   |   |   | Wool | 60 | 90 |

If in the above example instead of 5-isopropenyl-3-n-perfluoroheptyl-1,2,4-oxadiazole,
5-vinyl-3-n-perfluoropropyl-1,2,4-oxadiazole,
5-vinyl-3-n-perfluoroundecyl-1,2,4-oxadiazole or
5-vinyl-3-n-perfluorooctadecyl-1,2,4-oxadiazole and instead of n-octyl methacrylate, 2-ethylhexyl acrylate are employed, homo- and copolymers are obtained showing improved repellency ratings.

EXAMPLE 5

2% solutions of the homopolymer of 5-isopropenyl-3-n-perfluoroheptyl-1,2,4-oxadiazole and poly(n-octylmethacrylate) are blended in various ratios as shown in the following table and the blends applied to fabrics as in the foregoing examples and the repellency ratings determined with the results indicated in Table II.

TABLE II

| Ex. | Composition of blend | | Repellency (2% polymer on fabric) | | |
|---|---|---|---|---|---|
|   | 5-isopropenyl-3-n-perfluoroheptyl-1,2,4-oxadiazole (percent by weight) | Poly (n-octylmethacrylate) (percent by weight) | Fabric | 3-M-Oil | AATCC-water |
| 5a | 100 | None | Cotton | 90 | 90 |
|   |   |   | Wool | 80 | 80 |
| 5b | 60 | 40 | Cotton | 80 | 80 |
|   |   |   | Wool | 80 | 80 |
| 5c | 40 | 60 | Cotton | 80 | 80 |
|   |   |   | Wool | 80 | 70 |
| 5d | 20 | 80 | Cotton | 80 | 70 |
|   |   |   | Wool | 80 | 70 |
| 5e | 10 | 90 | Cotton | 70 | 70 |
|   |   |   | Wool | 80 | 70 |
| 5f | 5 | 95 | Cotton | 60 | 70 |
|   |   |   | Wool | 80 | 70 |

If in the above example instead of poly(n-octylmethacrylate) ethylene-propylene terpolymers or butadiene-styrene copolymers are employed, blends are obtained showing enhanced repellancy ratings.

EXAMPLE 6

100 parts of a mixture of equimolar amounts of trans-1,2 - bis[5-(3,n-perfluoroheptyl-1,2,4-oxadiazolyl)] ethylene prepared according to Example 2, and a vinyl ether as listed in the following Table III, 400 parts of ethyl acetate and 1 part of azobisisobutyronitrile are sealed in an ampul under nitrogen and polymerized at 80° for 16 hours. The resulting copolymer which precipitated during the polymerization reaction is then dissolved in 900 parts of hexafluoroxylene and the polymer solution is precipitated into 20 times the amount of methanol. The precipitated and dried polymers, white to slightly yellow powders or tacky materials are obtained in yields exceeding 80%.

The copolymers are applied to fabrics from a 2% solution in hexafluoroxylene to provide a coating of 2% by weight polymer on the fabric. The repellency ratings are determined as described above and are listed in the following Table III.

TABLE III

| Example | Vinyl ether | Appearance of copolymer | Repellency (2% polymer on fabric) | | |
|---|---|---|---|---|---|
|   |   |   | Fabric | 3-M-Oil | AATCC-water |
| 6a | CH$_2$=CHOCH$_3$ | Yellow-white powder | Cotton | 100 | 80 |
|   |   |   | Wool | 120 | 80 |
| 6b | CH$_2$=CHOC$_2$H$_5$ | Yellow-white tacky polymer | Cotton | 100 | 70 |
|   |   |   | Wool | 110 | 70 |
| 6c | CH$_2$=CHOCH$_2$CH(CH$_3$)$_2$ | Yellow tacky polymer | Cotton | 90 | 70 |
|   |   |   | Wool | 100 | 70 |
| 6d | CH$_2$=CHOCH$_2$CH$_2$OCH$_3$ | Yellow-tacky polymer | Cotton | 100 | 70 |
|   |   |   | Wool | 110 | 70 |
| 6e | CH$_2$=CHOCH$_2$CF$_3$ | Yellow powder | Cotton | 100 | 70 |
|   |   |   | Wool | 110 | 70 |

If in the above example instead of trans-1,2-bis[5-(3-n-perfluoroheptyl-1,2,4-oxadiazolyl)] ethylene,
cis- or trans-1,2-bis[5-(3-n-perfluoroheptyl-1,2,4-oxadiazolyl)]propene or
2,3-bis[5-(3-n-perfluoroheptyl-1,2,4-oxadiazolyl)] propene and instead of a vinyl ether styrene are employed, copolymers are obtained showing enhanced repellency ratings.

EXAMPLE 7

100 parts of a mixture of equimolar amounts of trans-1,2 - bis[5-(3-n-perfluoropropyl-1,2,4-oxadiazolyl)]ethylene produced according to Example 3, and methyl vinyl ether, 300 parts of ethyl acetate and 1 part of azobisisobutyronitrile are sealed in an ampul under nitrogen and polymerized at 70° for 16 hours. After the polymerization the polymer solution is diluted with 600 parts of ethyl acetate and precipitated into 20 times the amount of methanol. After drying, the copolymer is obtained as a fine, yellowish-white powder with melting point 93–102°.

The critical free surface energy of a polymer film determined by contact angle measurements as described in, Advances in Chemistry, Series 43, pp. 1–49, A.C.S. (1964), is 12 dynes/cm. Copolymers having critical free surface energies below 12 dynes/cm. can be obtained if in the above example trans-1,2-bis[5-(3-n-perfluoropropan-1,2,4-oxadiazolyl)]ethylene is replaced by trans-1,2-bis[5-(3 - n - perfluoroundecan-1,2,4-oxadiazolyl)]ethylene or trans - 1,2-bis[5-(3-n-perfluorooctadecan-1,2,4-diazolyl)]ethylene.

What is claimed is:

1. A composition of matter comprising a blend of a polymer having a skeletal chain comprising repeating units of

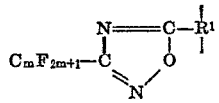

wherein $m$ is an integer of 1 to 18 and
$R^1$ is

—CH$_2$—CH$_2$— or —CH—CH$_2$—
                             |
                             CH$_3$ and poly (alkyl methacrylate).

2. A composition of matter comprising a blend of a polymer having a skeletal chain comprising repeating units of

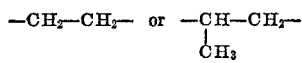

wherein $m$ is an integer of 1 to 18 and
$R^{2\prime}$ is an ethylene radical derived from fumaric, maleic, citraconic, mesaconic, or itaconic acid and poly (alkyl methacrylate).

3. Fabric coated with a perfluoroalkyl-oxadiazolyl olefinic polymer of claim 1 so as to be rendered both water and oil repellent thereby.

4. Fabric coated with a perfluoroalkyl-oxadiazolyl olefinic polymer of claim 2 so as to be rendered both water and oil repellent thereby.

5. Fabric coated with a copolymer having a skeletal chain comprising repeating units of

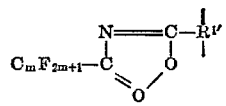

wherein $m$ is an integer of 1 to 18 and
$R^{1\prime}$ is

—CH$_2$CH$_2$— or —CH—CH$_2$—
                            |
                            CH$_3$ so as to be rendered both water and oil repellent thereby.

6. Fabric coated with a copolymer having a skeletal chain comprising repeating units of

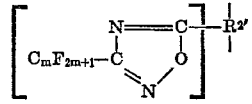

wherein $m$ is an integer of 1 to 18 and
$R^{2\prime}$ is an ethylene radical derived from fumaric, maleic, citraconic, or itaconic acid so as to be rendered both water and oil repellent thereby.

7. A composition comprising a difficult dyeable synthetic organic polymeric substance and as an assistant and dyesite a perfluoroalkyl-oxadiazolyl olefinic polymer as set forth in claim 1.

8. A composition comprising a difficult dyeable synthetic organic polymeric substance and as an assistant and dyesite a perfluoroalkyl-oxadiazolyl olefinic polymer as set forth in claim 2.

9. A composition comprising a difficult dyeable synthetic organic polymeric substance and as an assistant and dyesite a perfluoroalkyl-oxadiazolyl olefinic polymer as set forth in claim 5.

10. A composition comprising a difficult dyeable synthetic organic polymeric substance and as an assistant and dyesite a perfluoroalkyl-oxadiazolyl olefinic polymer as set forth in claim 6.

References Cited
UNITED STATES PATENTS 3,483,277  12/1969  Kleiner _____ 260—897

JOSEPH L. SCHOFER, Primary Examiner

J. KIGHT III, Assistant Examiner

U.S. Cl. X.R.

117—132 CF, 138.5, 138.8 UF, 139.5 A, 140 A, 142, 145, 148 155 UA, 161 UN, UC; 260—78.4 R, E, 78.5 B, 86.1 N, 89.5, 89.7, 874, 887, 890, 896, 897 C, 898, 899, 900